United States Patent
Jarvis

(10) Patent No.: US 9,180,546 B2
(45) Date of Patent: Nov. 10, 2015

(54) WELDING TOOL

(75) Inventor: Brian Laurence Jarvis, Salisbury Heights (AU)

(73) Assignee: Key Welding Products Australia Pty, South Australia (AU)

( * ) Notice: Subject to any disclaimer, the term of this patent is extended or adjusted under 35 U.S.C. 154(b) by 96 days.

(21) Appl. No.: 13/125,558

(22) PCT Filed: Oct. 21, 2009

(86) PCT No.: PCT/AU2009/001379
§ 371 (c)(1),
(2), (4) Date: Jul. 19, 2011

(87) PCT Pub. No.: WO2010/045676
PCT Pub. Date: Apr. 29, 2010

(65) Prior Publication Data
US 2011/0272383 A1    Nov. 10, 2011

(30) Foreign Application Priority Data

Oct. 21, 2008  (AU) ................................ 2008905432

(51) Int. Cl.
B23K 9/167   (2006.01)
B23K 9/29    (2006.01)

(52) U.S. Cl.
CPC ............... *B23K 9/167* (2013.01); *B23K 9/296* (2013.01)

(58) Field of Classification Search
USPC .............. 219/75, 136, 137.62, 137 R, 145.21
See application file for complete search history.

(56) References Cited

U.S. PATENT DOCUMENTS

| 4,309,588 A | 1/1982 | Hill |
| 5,892,199 A * | 4/1999 | Ahmed et al. ............ 219/137 R |

(Continued)

FOREIGN PATENT DOCUMENTS

| FR | 2299113 A | 8/1976 |
| GB | 613325 A | 11/1948 |
| GB | 731890 A | 6/1952 |
| GB | 918385 A | 2/1963 |

(Continued)

OTHER PUBLICATIONS

WIPO, Australian International Search Authority, International Search Report mailed Dec. 23, 2009 in International Patent Application No. PCT/AU2009/001379, 4 pages.

Primary Examiner — Brian Jennison
(74) Attorney, Agent, or Firm — Inskeep IP Group, Inc.

(57) ABSTRACT

A welding torch for gas tungsten arc welding, the welding torch including a torch head and a torch handle. The torch head includes a hollow inner body in electrical contact with one terminal of an electric power source, the inner body having an interior through which an axially positioned electrode extends, a free end of the electrode projecting beyond an electrode contact region of the inner body, and there being an inner gas chamber defined above the contact region within the interior of the inner body about the electrode. The torch head also includes a collet that provides the contact region where the inner body is in positive electrical contact with the electrode above the electrode free end, a gas shroud extending around but spaced from the electrode free end to define an outer gas chamber that allows, in use, gas to shield the electrode free end, and means for circulating coolant about or above the contact region to extract heat from the contact region. The inner body also includes at least one gas port allowing shielding gas to pass from the inner gas chamber to the outer gas chamber.

10 Claims, 4 Drawing Sheets

(56) References Cited

U.S. PATENT DOCUMENTS 6,884,958 B2 * 4/2005 Samler ........................... 219/75
2008/0210669 A1 9/2008 Yang et al.

FOREIGN PATENT DOCUMENTS

| GB | 1477655 A | 6/1977 |
| JP | 55014139 A | 1/1980 |

* cited by examiner

WELDING TOOL

RELATED APPLICATIONS

This patent application claims priority to International Patent Application No. PCT/AU2009/001379, International Filing Date 21 Oct. 2009, entitled A Welding Torch, which claims priority to Australian provisional patent application 2008905432 filed on 21 Oct. 2008 entitled A Welding Torch, the contents of both of which are incorporated herein by this reference.

FIELD OF THE INVENTION

The present invention relates to high current capacity gas tungsten arc welding (GTAW) torches, and more particularly to a welding torch suitable for use in the welding process known as keyhole GTAW.

BACKGROUND OF THE INVENTION

The GTAW process, sometimes also referred to as a tungsten inert gas (TIG) welding process, is a well known arc welding process used for joining a wide range of metals and alloys. The keyhole GTAW process is a high productivity variant of GTAW that is capable of the single pass, full penetration welding of metals and alloys that may, in some cases, exceed 12.7 mm in thickness. The keyhole GTAW process (K-GTAW) is described in Australian patent 744847, the content of which is incorporated herein by reference.

As will be seen from Australian patent 744847, the described K-GTAW process typically requires the welding current to be between three hundred and eight hundred amps. It also requires the generated welding arc to have highly stable and reproducible characteristics; one such characteristic, contrary to other GTAW processes, being a high arc pressure. Having said that, most other conditions necessary for the described K-GTAW process are achieved in a manner consistent with the definition and general understanding of standard GTAW processes, and therefore without the addition of orifices and additional gas flows to constrict and modify the arc (as is the case in plasma arc welding).

Indeed, in the past, the described K-GTAW process has been implemented using a welding torch that was developed prior to the development of the K-GTAW process, namely the CSIRO-developed High Current TIG torch (HC TIG torch) described in U.S. Pat. No. 5,892,199. The HC TIG torch is the only commercially available torch known to be capable of reliably supporting the K-GTAW process, albeit in a manner designed primarily for research applications rather than industrial applications.

It is an aim of the present invention to provide a welding torch suitable for use with the K-GTAW process in an industrial environment.

Before turning to a summary of the present invention, it must be appreciated that the above description of the prior art has been provided merely as background to explain the context of the invention. It is not to be taken as an admission that any of the material referred to was published or known, or was a part of the common general knowledge in Australia or elsewhere.

It is also useful to provide an explanation of some of the terms that will be used to define the spatial relationship of the various parts of the welding torch of the present invention. In this respect, spatial references throughout this specification will generally be based upon the welding torch oriented to be used from above a generally horizontal work-piece. With this environment as the basis, various parts of the welding torch may then be defined with reference to such an orientation, allowing further references to "above" and "upper" or "below" and "lower", or the like.

Also, some aspects of the present invention that may ultimately be claimed in isolation (and not in an in-use environment), may nonetheless be difficult to describe and understand in isolation. Thus, some of the following description does describe the invention and its embodiments in such an in-use environment (for example, a welding torch when used in a K-GTAW process). Of course, it must be appreciated that the use of such description to define the present invention is not to be seen as a limitation, and certainly is not to be seen as a limitation only to the in-use environment, unless that intention is clearly stated.

SUMMARY OF THE INVENTION

The present invention provides a welding torch for gas tungsten arc welding, the welding torch including a torch head and a torch handle, the torch head including:
- a hollow inner body in electrical contact with one terminal of an electric power source, the inner body having an interior through which an axially positioned electrode extends, a free end of the electrode projecting beyond an electrode contact region of the inner body, there being an inner gas chamber defined above the contact region within the interior of the inner body about the electrode;
- a collet that provides the contact region where the inner body is in positive electrical contact with the electrode above the electrode free end;
- a gas shroud extending around but spaced from the electrode free end to define an outer gas chamber that allows, in use, gas to shield the electrode free end; and
- means for circulating coolant about or above the contact region to extract heat from the contact region;

wherein the inner body also includes at least one gas port allowing shielding gas to pass from the inner gas chamber to the outer gas chamber.

The inner body is preferably formed as a one-piece component (either cast or machined) that conveys the electrical current between the electric power source and the electrode. Preferably, the inner body is formed from a high conductivity material, such as a copper-chromium alloy or a phosphor bronze, to maximize electrical and thermal conductivity while retaining good mechanical properties, thereby maximizing process performance.

The inner body is hollow so as to allow the electrode (or at least an upper portion of the electrode) to be retained therein in a manner that forms the inner gas chamber thereabout as mentioned above. In this respect, the inner body may have any cross-sectional shape as is desired, and may for instance be square, ovoid or circular. It is envisaged that the symmetry and ease of manufacture that is provided by a circular cross-section will generally result in the inner body being an annular inner body. In this respect, it will of course be appreciated that the reference to "hollow" and "annular" does not preclude the inner body having a cap or the like at one end (normally the upper end) to close the inner chamber, and having the contact region at the other end (normally in a lower portion of the inner body) which effectively closes the lower end of the inner chamber about the electrode, such that the free end of the electrode extends beyond that lower portion of the inner body. This effectively results in an upper portion of the electrode being contained within the inner gas chamber.

The region of the inner body where the electrical contact with the electrode is formed (referred to hereafter simply as the "contact region") will thus ideally be in a lower portion of the inner body. In the present invention, this contact region will be the only region in which electrical contact is provided from the inner body to the electrode, and thus from the electric power source to the electrode.

Indeed, in a preferred form, the collet is located between the inner body and the electrode such that the only physical contact made between the two is via the collet. It is in this context that reference has been made above to the inner body being in "positive" electrical contact with the electrode, the reference to "positive" meaning that the configuration and arrangement of the lower portion of the inner body, of the collet, and of the electrode is such that the location and size of the region across which electrical contact is made with the electrode is predetermined, known and constant.

In this respect, a difficulty with some prior art welding torches is that this region will move or relocate during operation and/or ageing of the torch, often due to there being two or more different parts making contact with (or nearly making contact with) the electrode. As will be appreciated, welding torches are usually carefully designed to deal with the high temperatures and high currents carried thereby, and movement of the contact region invariably also moves the thermal and electrical pathways to locations away from the intended design locations. Even a slight movement away may result in thermal stresses, for example, being placed on parts or elements that were not designed to cope with such thermal stresses.

With regard to the preferred use of a collet to achieve the positive electrical contact for the contact region, it will be appreciated that a collet is essentially a sleeve that will normally have one or more longitudinal slits therealong (usually along the full length of the collet) that is arranged to be closed about, in this case, the electrode to accurately and tightly grip or clamp the electrode. It will thus also be appreciated that the collet may thus itself be provided in one or more parts, such as in collet halves, and that the collet may be configured for use in conjunction with a clamping member, such as a contact tip nut, that assists in compressing the collet to grip firmly against the electrode.

Ideally, the collet will be formed of a durable, highly conductive material such as copper, phosphor bronze or a copper chromium alloy. Additionally, the collet may be electroplated with silver, gold or another noble metal to prevent oxidation of its surface. In this respect, the electrode will ideally be made of tungsten with an addition of between 1 and 2% lanthanum. The electrode will preferably have a diameter of about 6.4 mm, although it will be appreciated that other electrode diameters, and indeed additions other than lanthanum, may be used. With this in mind, it will also be appreciated that one of the advantages of utilizing a collet in the welding torch of the present invention is that collets of different internal diameters (but the same external diameters) may easily be provided to allow for the ready use of electrodes with different diameters.

As mentioned above, the interior of the inner body defines an inner gas chamber. Of course, the axially positioned electrode is situated centrally within that chamber (or at least generally centrally), such that shielding gas entering the inner gas chamber is conveyed between the electrode and the interior walls of the inner gas chamber, through the gas ports (preferably in the lower portion) of the inner body to a location that is effectively outside the inner body but still about the free end of the projecting electrode and within the outer gas chamber defined within the gas shroud. Indeed, in this form, there is preferably a series of gas ports (such as either of 2, 3, 4, 5 or 6 gas ports) located symmetrically about the lower portion of the inner body.

This preferred geometry promotes uniform distribution of the shielding gas about and within the inner gas chamber, so as to provide uniform gas flow through the ports to the outer gas chamber. The movement of the shielding gas through the inner gas chamber (and thus about the upper portion of the electrode) also assists in providing the electrode with additional cooling.

The torch head for the welding torch of the present invention preferably also includes an outer body assembly that, in one form, includes at least one outer body member and at least one intermediate insulating member. In another form however, the outer body assembly may be formed as an integral one-piece unit that includes a portion or a part that is able to function as an insulating member in the manner about to be described.

In the form of the present invention where there is an outer body assembly, and where the outer body assembly includes at least one outer body member and at least one intermediate insulating member, the insulating members preferably provide electrical isolation between the inner and outer bodies, and also preferably provide a means for circulating coolant about or above the contact region to extract heat from the contact region.

With regard to the coolant circulating means, in a preferred form, one or more insulating members of an outer assembly are configured so as to act as a manifold to constrain and direct coolant about or above the contact region as mentioned above. In this form, an insulating member will preferably include a coolant inlet port and a coolant outlet port, and will be spaced from at least a portion of the inner body such that coolant may be conveyed from the inlet port about at least a portion of the inner body that is either immediately about the contact region or is closely adjacent to the contact region, so as to extract heat from the contact region, and thereafter pass out through the outlet port.

With this in mind, in a preferred form, the inner body will include at least one coolant channel to assist with the passage of coolant over or through the inner body, again at a location about or above the contact region. The reference to "about or above" the contact region is intended to convey that the circulation of coolant, and the extraction of heat from the contact region, can be provided by a coolant circulation means that is configured and located in any manner that gives rise to a desirable amount of heat being extracted from the free end of the electrode (where the heat is initially generated) and thus from the contact region.

If the coolant circulation means is configured and located to be immediately about and around the contact region, this may prove to be the most effective heat extraction technique. Alternatively, manufacturing constraints may dictate that the coolant circulation means is preferably configured and located closely adjacent to the contact region, such as immediately above the contact region (being towards, and as a part of, the lower portion of the inner body). Indeed, this alternative will be seen below in the preferred embodiment of the present invention described in relation to the accompanying drawings.

In relation to cooling and the preferred extraction of heat, in yet a further preferred form of the present invention, the gas shroud will be arranged so that it is in direct contact with the lower portion of the outer body, preferably such that any cooling of that lower portion (and thus extraction of heat from that lower portion) also has the effect of extracting heat from the gas shroud in contact with it. Indeed, in one form, the gas shroud will be configured so as to be secured to and against a shoulder of the lower portion of the outer body to make direct contact therewith.

With further regard to the outer body assembly, in a preferred form there are two outer body members (both either being cast or machined as one-piece members), being a lower outer body member configured to house at least the lower portion of the inner body (and thus whatever portion of the insulating members that is located therebetween), and an upper outer body member configured to house the rest of the inner body (and thus the rest of the insulating members). In this form, the upper outer body member may include a means for porting the shielding gas from a gas supply line (via the torch handle, depending upon its location and configuration) to the inner gas chamber, while the lower outer body member may include an opening to permit access by the electrical source terminal to the electrode (again, via the torch handle depending upon its location and configuration), and means for porting the incoming and outgoing coolant to the inlet and outlet ports respectively of the insulating members. In this form, it may be this lower outer body member to which the gas shroud is secured so as to assist in the heat extraction from the gas shroud.

Therefore, in a preferred form, it will be appreciated that the torch head is thus likely to include a one-piece inner body, housed within two outer body members that form, with one or two insulating members, an outer body assembly. The torch head houses the electrode and is designed to generate optimal conditions for a keyhole GTAW process. These conditions include efficient cooling of the electrode, the contact region between the electrode and the inner body, and the gas shroud, a low resistance path for electrical current to the electrode, and directed gas flow to shield the electrode and a desirable area around the arc impingement zone.

The function of the torch handle is of course to convey electrical current, coolant, shielding gas and electrical signals between external devices and the torch head. The handle is also used for supporting the torch head and for clamping the torch to a supporting structure or manipulation system, if required. With this in mind, it should be appreciated that the torch handle (and, indeed, consequential aspects of the torch head insofar as it interacts with the torch handle) can be configured so as to extend either axially or laterally away from the torch head. The reference to axial and lateral here is a reference to the electrode axis and thus the axis of the hollow inner body of the torch head.

BRIEF DESCRIPTION OF DRAWINGS

The present invention will now be described in relation to an embodiment thereof. In this respect, it is to be appreciated that the following description of the embodiments does not limit in any way the generality of the above description.

In the drawings.

DETAILED DESCRIPTION OF THE DRAWINGS

Figure 1:
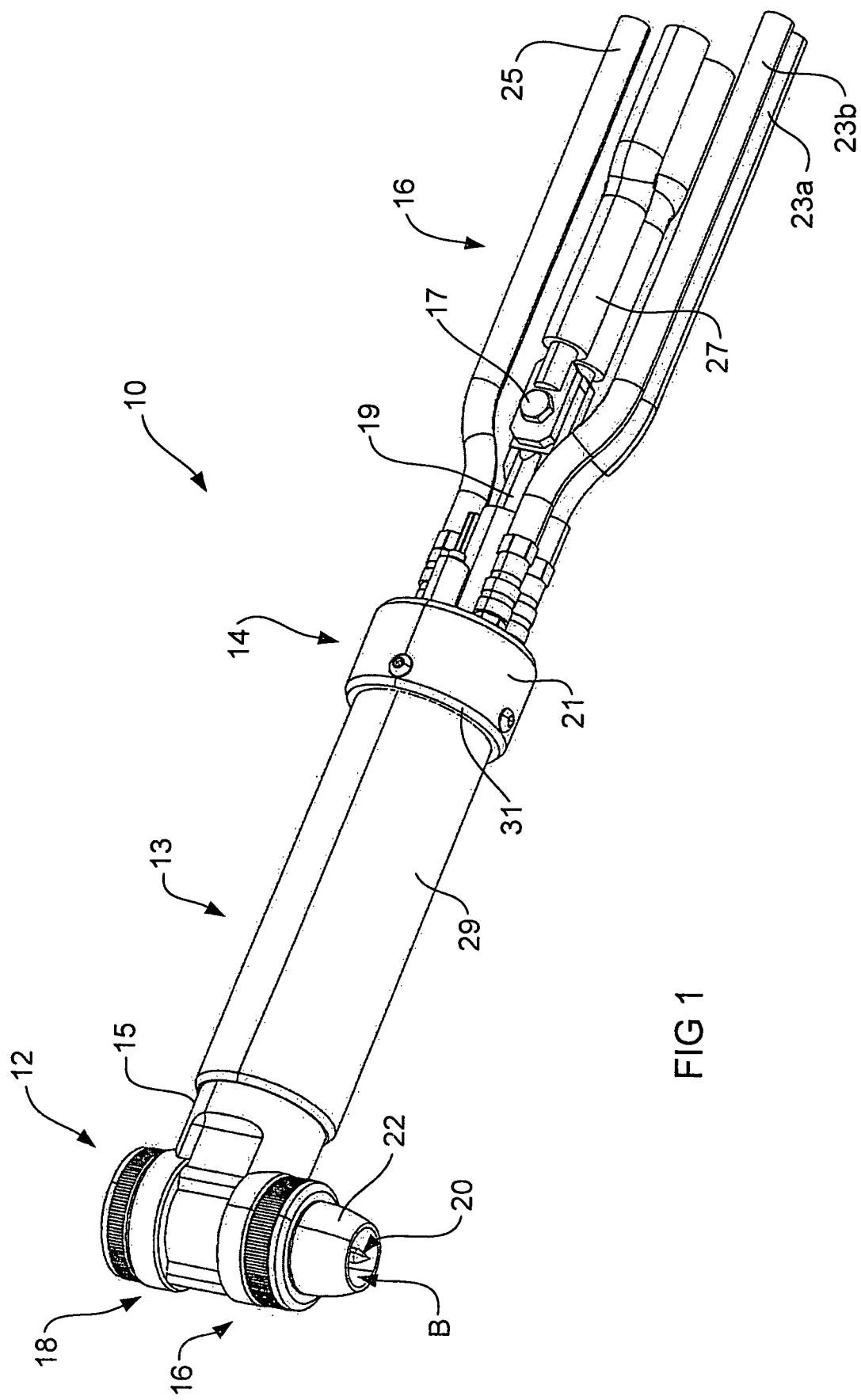
FIG. 1 is a perspective view from below of an embodiment of a welding torch in accordance with the present invention, showing a torch head and a torch handle.

Illustrated in FIG. 1 is an embodiment of a welding torch 10 in accordance with the present invention, designed to generate optimal conditions for a keyhole GTAW process. The welding torch 10 generally includes a torch handle 14 for conveying electrical current, coolant, shielding gas and electrical signals between external devices and the torch head 12. The torch handle 14 is also of course used for supporting the torch head 12 and for clamping the torch 10 to a supporting structure or manipulation system, if required. In this embodiment, the torch handle 14 is shown extending laterally away from the torch head 12, however it is to be appreciated that other embodiments of the invention envisage the torch handle 14 being configured to extend axially away from the torch head 12, so as to (figuratively speaking) be arranged above the torch head 12.

In the embodiment illustrated, the torch head 12 generally includes an inner body (not evident in FIG. 1), housed within two outer body members (generally indicated in FIG. 1 by reference numerals 16,18) that form, with two insulating members (also not evident in FIG. 1), an outer body assembly. In a manner that will be better described below, the torch head 10 also includes an electrode 20 (with only the tip of the electrode 20 being evident in FIG. 1) with a gas shroud 22 extending around but spaced therefrom, creating an outer gas chamber B therebetween. The optimal welding conditions provided by the torch head 12 include efficient cooling of a contact region (to be described below), the electrode 20 and the gas shroud 22, a low resistance path for electrical current to the electrode 20, and directed gas flow to shield the electrode 20 (including the free end of the electrode 20 within the gas shroud 22), and a desirable area around the arc impingement zone (not shown).

Figure 2A:
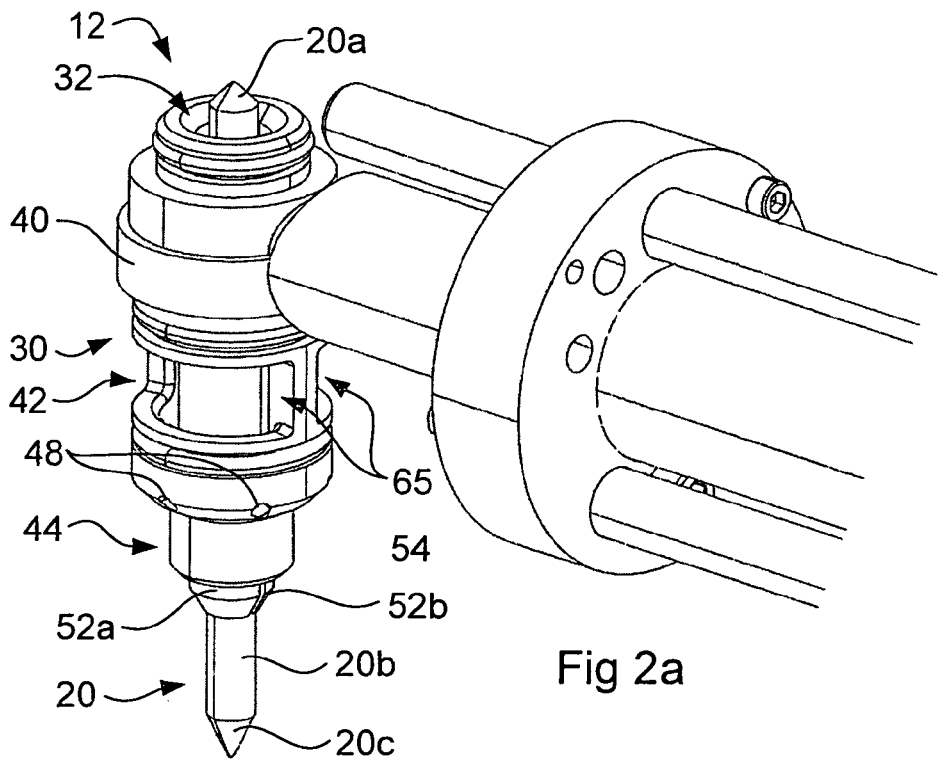
FIGS. 2a, 2b and 2c are perspective views from different angles of the torch head from FIG. 1 in different states of assembly, thus showing different components thereof.
Figure 2B:
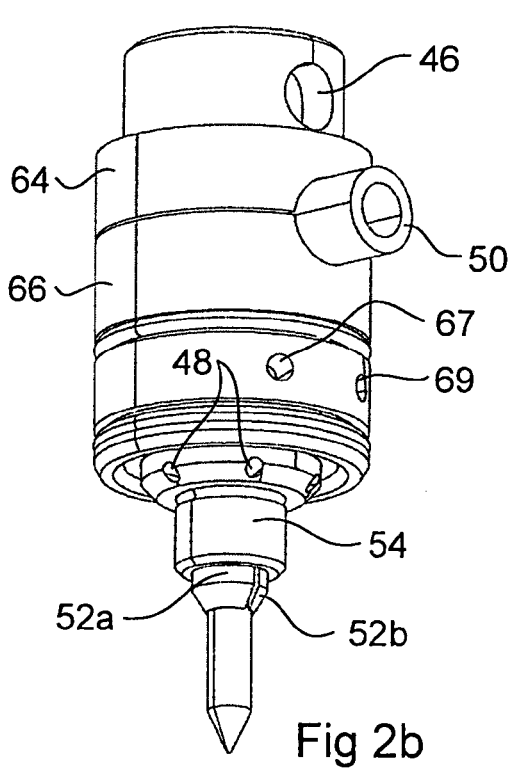
Figure 2C:
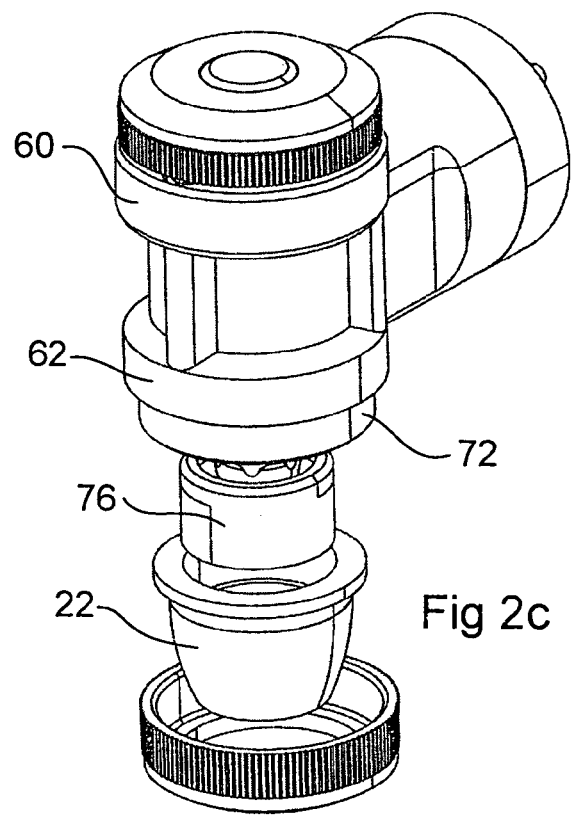
Figure 3:
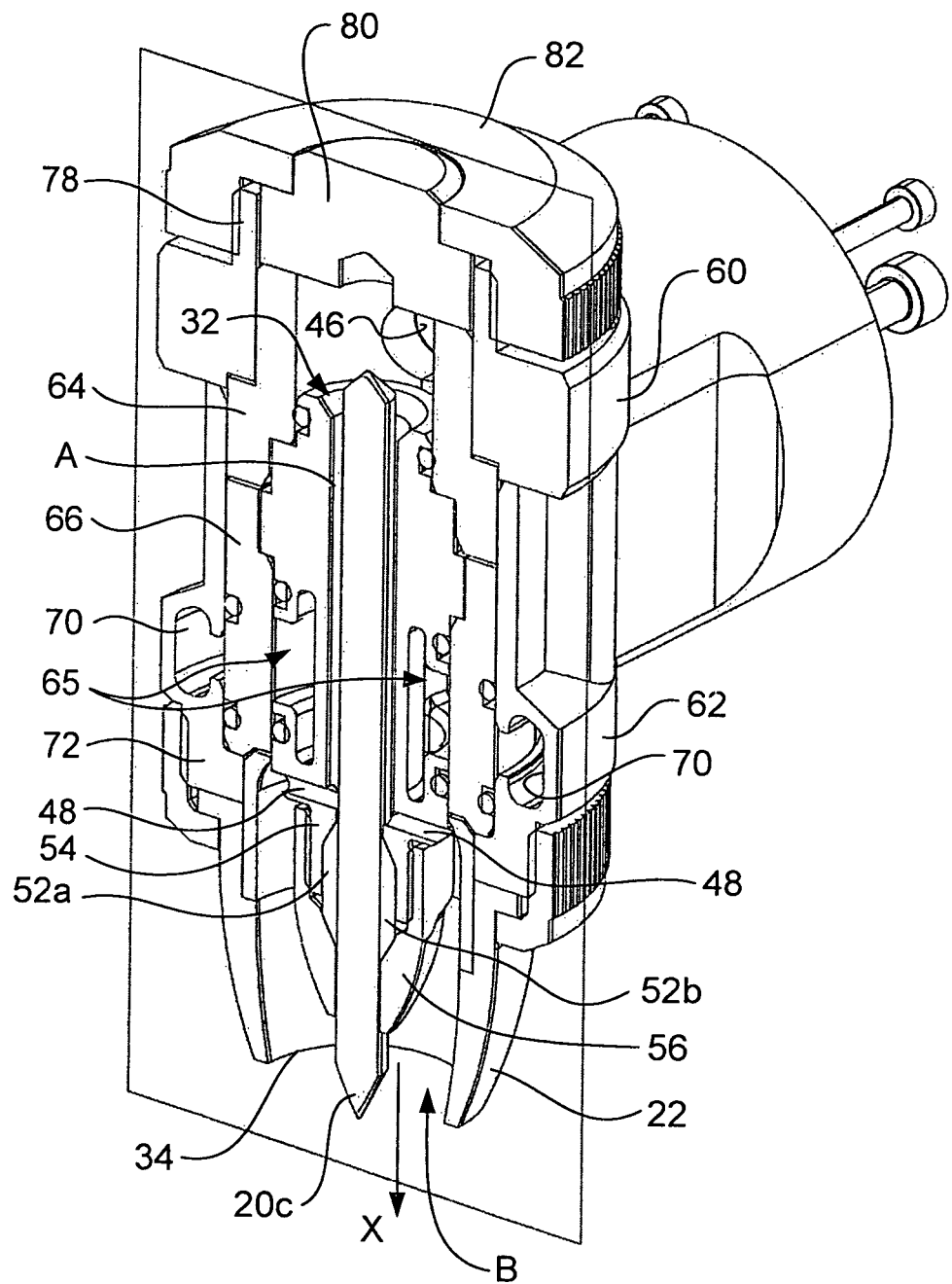
FIG. 3 is a section view through the longitudinal axis of the torch head from FIG. 1.
Figure 4A:
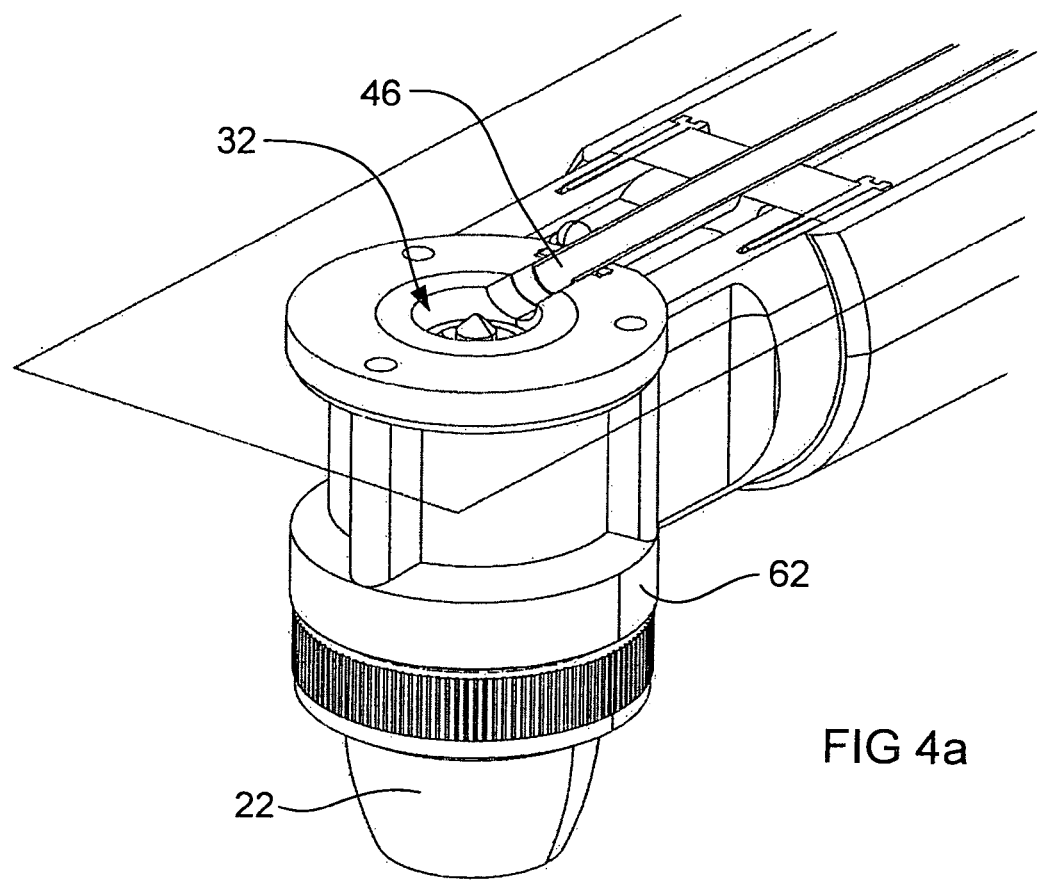
FIGS. 4a and 4b are section views through two different planes perpendicular to the section view of FIG. 3.
Figure 4B:
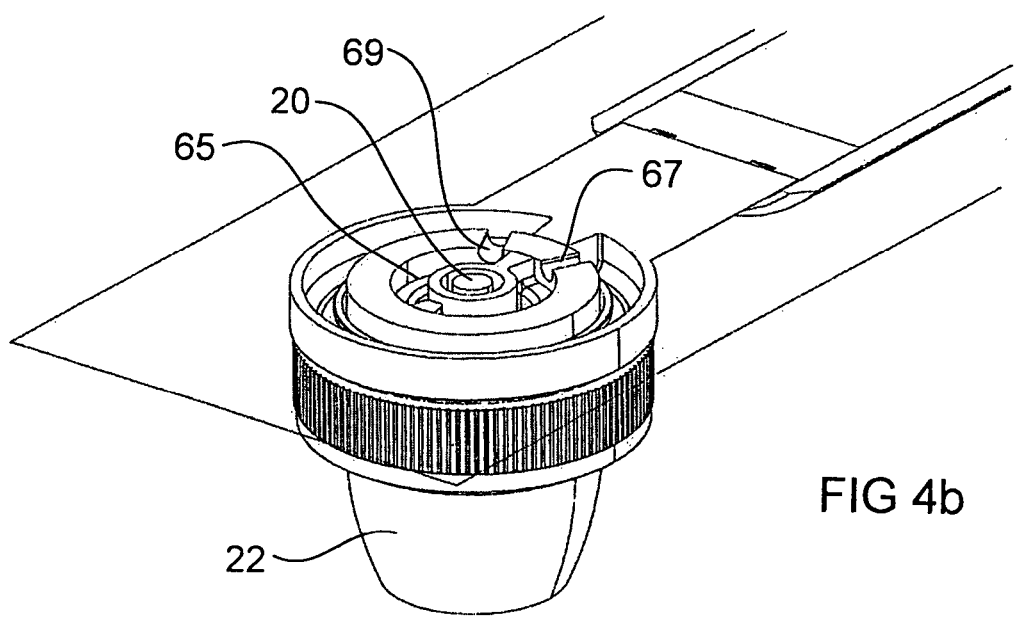

Before turning to a more detailed description of the torch head 12 with respect to the more detailed views of FIGS. 2 to 4, a general description of various preferred aspects of the torch handle 14 of this embodiment will be provided. However, this general description will address some aspects that are not evident in the general illustration of FIG. 1, and it will be appreciated that the present invention is not to be limited to any particular aspect of the torch handle 14.

The torch handle 14 in this embodiment connects to the side of the torch head 12, and thus extends laterally away from the torch head 12 with respect to the longitudinal axis of the electrode 20. The various services required at the torch head 12 are conveyed within the torch handle 14. These services are the shielding gas (the gas required to shield the electrode 20 and weld pool from exposure to the atmosphere), the coolant, the welding current to the electrode 20, and optional electrical leads to drive indicator lamps (typically LED's) to indicate the status of the welding torch 10. Typically, the indicators would be switched on as a safety precaution whenever power is available at the torch head 12.

The torch handle 14 in this particular embodiment ideally includes an electrical sub-assembly 16 and a mounting sub-assembly 13, the electrical sub-assembly including an electrical connector 17, an electrical rod 19 and electrical rod insulators, while the mounting sub-assembly 13 includes a torch head flange 15, a connector bulkhead 21, an inner tube, coolant tubes (incoming 23a and outgoing 23b coolant tubes) and a gas tube 25. The extensions of these tubes as a part of the electrical sub-assembly 16 are marked with reference numerals 23a, 23b and 25 in FIG. 1.

The electrical sub-assembly conveys the welding current between the welding cables 27 and the torch head 12. It also provides electrical isolation from the metallic components in the mounting sub-assembly 13 and the torch body. The electrical rod 19 consists of a high conductivity copper rod that is, in one form, preferably of approximately 12.7 mm diameter. It is terminated at one end with an electrical connector 17 of suitable size for the attachment of the welding cables 27 (e.g. 20 mm wide, 8 mm thick high conductivity copper). The electrical connector 17 is silver soldered to the electrical rod 19. The other end of the rod is silver soldered to the inner body (as will be described below) of the torch head 12. The rod is insulated from the torch handle and the outer body of the torch head 12 by a two-piece plastic sleeve (that is a plastic cylinder slit along its length).

The mounting sub-assembly 13 essentially consists of four tubes (not shown) fixed between the torch head flange 15 at one end and a connection bulkhead 21 at the other. The torch head flange 15 attaches to the torch head 12. The connection bulkhead 21 enables connection of the coolant (23a, 23b) and gas (25) lines, and also has a small port available for electrical cabling for indicator lamps mounted at the torch head 12.

A central tube (not shown) within the mounting sub-assembly 13 surrounds the electrical rod and its insulating sleeve. These protrude from the connection bulkhead 21 to allow attachment of the welding cable 27. The two lower tubes (23a, 23b) take coolant to and from the torch head 12. The forth tube (25) caries the torch gas to the upper section of the torch head 12.

The mounting sub-assembly 13 is housed inside an outer cylinder 29. The outer cylinder 29 fits into a spring cover cylinder 31 and is secured by four bolts. These bolts project into a circumferential grove on the outer diameter of the connection bulkhead 21. Ideally, four recesses (not shown) are machined into this groove such that the bolts can be captured by them. A spring inside the spring cover cylinder 31 applies the necessary force to lock the cover in position. The result is that the electrical sub-assembly 16 can be pushed into the connection bulkhead 21 to release the lock, and then rotated to provide easy access to the welding electrode.

Having descried various aspects of one form of torch handle 14, it will be appreciated by a skilled addressee that various obvious modifications would need to be made to the above described aspects in the event that the torch handle 14 was required to extend axially away from the torch head 12. Such modifications will not be described here.

Now turning to a description of the various components of the torch head 12, reference will generally be made to the three different views provided in FIGS. 2a, 2b and 2c, which show the torch head 12 in differing stages of assembly to reveal the different components. Having said that, the section views of FIGS. 3, 4a and 4b will also be referenced from time-to-time to provide assistance in understanding the final relationship of those components in the assembled state.

With reference firstly to FIG. 2a, the torch head 12 includes a hollow inner body 30 (in this embodiment being an annular inner body) having an interior 32 through which an upper portion 20a of an axially positioned electrode 20 extends. The torch head 12 also includes a gas shroud 22 (seen better in FIGS. 1, 2c and 3) extending around but spaced from the free end 20b of the electrode 20, such that the electrode tip 20c projects from the shroud 22 through a shroud opening 34.

The inner body 30 includes an upper portion 40 in electrical contact with one terminal of an electric power source, and in this embodiment of the invention also includes a central portion 42 about which coolant may be constrained to pass. The inner body 30 additionally includes a lower portion 44 within which a contact region can generally be identified.

Also, the interior 32 of the inner body 30 defines an inner gas chamber A, and the lower portion 44 of the inner body 30 defines with the gas shroud 22 an outer gas chamber B. There is a gas inlet 46 (also shown in the section view of FIG. 4a) to the inner gas chamber A, a gas outlet X (evident in FIG. 3) via the shroud opening, and multiple gas ports 48 (evident in FIGS. 2a, 2b and 3) in the lower portion 44 of the inner body 30 allowing gas communication between the inner A and outer B gas chambers.

In this embodiment, the lower portion 44 of the inner body 30 is shown as being in contact with a collet 52 (provided by collet halves 52a, 52b), which in turn is in contact with the electrode 20 to define the contact region. Referring specifically to FIG. 3, it can be seen that it is only the collet that is in contact with the electrode, thus providing positive electrical contact with the electrode 20, such that the location and size of the region across which electrical contact is made with the electrode is predetermined, known and constant.

The interior of the lower portion 44 of the inner body 30 is machined to have an internal diameter that is the same as the external diameter of the combined collet halves 52a, 52b such that the collet 52 fits tightly (in direct contact) within the lower portion 44 of the inner body 30. The combined collet halves 52a, 52b are then required to have an internal diameter that is the same as the external diameter of the electrode 20 such that the electrode 20 fits tightly (in direct contact) within the combined collet halves 52a, 52b, with the electrode 20 effectively clamped therebetween.

The inner body 30 is preferably a machined (or cast) component that conveys electrical current between the input electrical rod (being the rod in electrical contact with one terminal of an electric power source) through the opening 50 in the upper portion 40 of the inner body 30, and the collet 52. The inner body 30 also conveys heat from the collet 52 to the coolant that circulates around the central portion 42 of the inner body 30.

Also, the short section 54 of the lower portion 44 of the inner body 30, below the gas ports 48, is machined and threaded on its outside diameter to allow a clamping member such as a contact tip nut 56 to be screwed onto it. It is further machined on the interior surface so that when the contact tip nut 56 surrounding the collet 52 is tightened, the combined collet halves 52a, 52b are compressed between the short section 54 of the lower portion 44 and the electrode 20 to provide the positive electrical connection mentioned above, and to define the contact region, without causing the contact tip nut 56 itself to contact the electrode.

In this respect, the collet halves 52a, 52b, the short section 54 of the lower portion 44 of the inner body 30, and the contact tip nut 56 are all preferably machined to matching angles, typically about 60° to the horizontal respectively, to ensure a relatively large surface area on the interior walls of the collet halves 52a, 52b to serve as the contact region.

Referring now specifically to FIGS. 2b, 2c and 3, the inner body 30 is contained within an outer body assembly that includes, in this embodiment, two outer body members 60 and 62 and two intermediate insulating members 64 and 66. The insulating members 64, 66 provide electrical isolation between the inner 30 and outer 60, 62 bodies. The insulating members 64, 66 also provide a coolant circulation means by acting as a manifold to constrain and direct coolant about, in this embodiment, the central portion 42 of the inner body 30 via channels 65 located in the central portion 42 of the inner body 30.

The insulating members 64, 66 thus include a coolant inlet port 67 and a coolant outlet port 69, and are spaced from at least a portion of the inner body 30 central portion 42 (such as via the use of the channels 65) such that coolant may be conveyed from the inlet port 67 about at least a portion of the inner body 30 central portion 42 to extract heat therefrom and thereafter pass out through the outlet port 69. As can be seen, the configuration of these channels within and about the central portion 42 locates the coolant circulating means above but closely adjacent to the contact region so as to assist in extracting heat from that contact region and from the free end 20b of the electrode 20.

The two outer body members 60, 62 are also machined (or cast), and include a lower outer body member 62 configured to house the lower 44 and central 42 portions of the inner body 30 (and thus the portions of the insulating members 64, 66 that are located therebetween), and an upper outer body member 64 configured to house essentially only the upper portion 40 of the inner body 30 (and thus the upper portion of the insulating member 64). The upper outer body member 60 thus includes a means for porting 46 the gas from a gas supply line to the inner gas chamber A, while the lower outer body member 62 preferably includes an opening (not shown) to permit access by the electrical source terminal to the electrode 20 and means for porting the incoming and outgoing coolant to the inlet 67 and outlet 69 ports respectively of the insulating member, shown in FIG. 3 via a cooling channel 70 about the interior wall of the lower outer body member 62.

Additionally, the base 72 of the lower outer body member 62 is machined to provide a smooth, flat surface to provide good thermal contact with the gas shroud 22. The cooling channel 70 in the lower outer body member 62 immediately above the base 72 thus additionally allows rapid removal of heat conducted from the shroud 22, in addition to providing a passageway for the coolant to the inlet port 67 of the insulating member. The outer body members 60, 62 are preferably machined from a high conductivity material, preferably phosphor bronze, to meet performance requirements.

The base 72 of the lower outer body member 62 is also externally threaded to connect with a shroud nut 76, and the upper section 78 of the upper outer body member 60 is externally threaded so that a top cap 80 can be held in position with a top screw cap 82. The top cap 80 includes a hollow section to enclose the protruding upper end of the electrode 20. Different length caps 80 could be available to accommodate different length electrodes 20. In particular, the overall height of the torch head 12 can be minimised by using a short electrode 20 and a small top cap 80. This is useful when improved access to weld joints is required.

The gas shroud 22 is associated with the shroud nut 76 and an insulating UV guard (that role being played in this embodiment by the short section 54 mentioned above). The gas shroud 22 is preferably machined from a high conductivity aluminium or copper alloy. Aluminium shrouds are recommended for lower current applications, whereas the copper alloy shrouds are recommended for more robust performance. As indicated above, the gas shroud 22 is ideally cooled by conduction to the base 72 of the lower outer body member 62, while the shroud nut 76 clamps the shroud 22 to the base of the lower outer body member 62. The shroud nut is preferably also a highly conductive material such as phosphor bronze or more preferably a copper chromium alloy. The UV guard 54 is machined from an insulating and temperature resistant material. In this embodiment, PTFE is used. The UV guard 54 provides added electrical insulation against possible arcing between the shroud 22, the inner body 30 and the electrode 20.

As mentioned above, a primary requirement of the keyhole GTAW process is the capability of operation at welding currents of up to 800 amps, and preferably up to 1000 amps. With this in mind, the welding torch of the present invention is intended for operation to 1000 amps, which is able to be achieved by (amongst other things): the provision of highly efficient heat transfer from the free end 20b of the electrode 20 and the contact region; by the preferred use of 6.4 mm diameter electrodes as standard (within a relatively large outer gas chamber B created by the relatively large gas shroud thereabout); by the preferred use of metallic shrouds rather than ceramic shrouds for greater strength and heat resistance; by the preferred use of high conductivity copper or copper alloy for all current carrying elements; and by being able to utilise relatively large conductor cross sections throughout the welding torch.

With respect to the relatively large gas shroud 22, the welding torch 10 of the present invention has been designed to be able to utilise, in a preferred form, a gas shroud 22 having a large 24 mm opening. This provides a relatively large separation between the free end 20b of the electrode 20 and the surrounding atmosphere, thereby decreasing contact between the hot electrode and atmospheric gases.

Additionally, heat extraction from the free end 20b of the electrode 20 is highly preferable for the generation of high arc pressures and thus for the implementation of the keyhole process. Thus, in the welding torch 10 of the present invention, the coolant is ideally directed to a location close to the contact region. Further, the preferably short, high conductivity collet 52 capable of being firmly compressed between the lower portion 44 of inner body 30 and the electrode 20, assists in providing a high conductivity thermal path of as little as 10 mm length from the electrode 20 to the coolant. Further still, the electrical contact area has been maximised by increasing the outer diameter of the collet 52 and by angling the end surfaces of the collet 52. To further assist, the contact tip nut 56 may also be machined from high conductivity copper chromium alloy to further aid conduction to the cooled base of the inner body 30.

Indeed, the preferably highly conductive collet provides the only non-negligible electrical and thermal path between the inner body 30 and the electrode 20, which assists in enabling highly reproducible arc behaviour, which is also an important requirement for the keyhole process.

In conclusion, it must be appreciated that there may be other variations and modifications to the configurations described herein which are also within the scope of the present invention.

The claims are as follows:

1. A welding torch for gas tungsten arc welding, the welding torch including a torch head and a torch handle, the torch head including:
    a collet having a first end and an opposite second end and an internal diameter that is the same as or slightly less than an external diameter of an electrode, the internal diameter defining an electrical contact region of the electrode;
    a hollow inner body in electrical contact with one terminal of an electric power source, the inner body having an interior through which the electrode axially extends, a lower portion of the inner body having an internal diameter that receives the first end of the collet, a lower portion of the inner body having a threaded external portion;
    an inner gas chamber defined within the interior of the inner body about a portion of the electrode;
    a collet clamping member having an internal diameter that receives the second end of the collet and a threaded internal portion engaged with the threaded external portion of the lower inner body, a tightening of the collet clamping member over the threaded external portion of the lower inner body compressing the first end and the second end of the collet against the electrode;
    a gas shroud extending around the electrode free end to define an outer gas chamber that allows, in use, a shielding gas to shield a free end of the electrode;

a passageway for circulating coolant about or above the electrical contact region to extract heat from the electrical contact region; and at least one gas port allowing the shielding gas to pass from the inner gas chamber to the outer gas chamber.

2. A welding torch according to claim 1, wherein the torch head also includes an outer body assembly that includes at least one outer body member and at least one intermediate insulating member.

3. A welding torch according to claim 2, wherein each insulating member provides electrical isolation between the inner and outer bodies.

4. A welding torch according to claim 2, wherein at least one insulating member provides the coolant circulating means.

5. A welding torch according to claim 4, wherein the insulating member that provides the coolant circulating means acts as a manifold to constrain and direct coolant about at least a portion of the inner body.

6. A welding torch according to claim 5, wherein the insulating member that provides the coolant circulating means includes a coolant inlet port and a coolant outlet port, and is spaced from at least a portion of the inner body such that coolant may be conveyed from the inlet port about at least a portion of the inner body to extract heat from the contact region and thereafter pass out through the outlet port.

7. A welding torch according to claim 6, wherein the inner body includes a central portion, the central portion including at least one coolant channel to assist with the passage of coolant over or through the inner body and thus with the extraction of heat from the contact region.

8. A welding torch according to claim 2, wherein there are two outer body members, being a lower outer body member configured to house at least the lower portion of the inner body (and thus whatever portion of the insulating members that is located therebetween), and an upper outer body member configured to house the rest of the inner body (and thus the rest of the insulating members).

9. A welding torch according to claim 8, wherein the upper outer body member includes a means for porting the shielding gas from a gas supply line to the inner gas chamber.

10. A welding torch according to claim 8, wherein the lower outer body member includes an opening to permit access by the electrical source terminal to the electrode and means for porting the incoming and outgoing coolant to the inlet and outlet ports respectively of the insulating members.

* * * * *